United States Patent Office 3,360,199
Patented Dec. 26, 1967

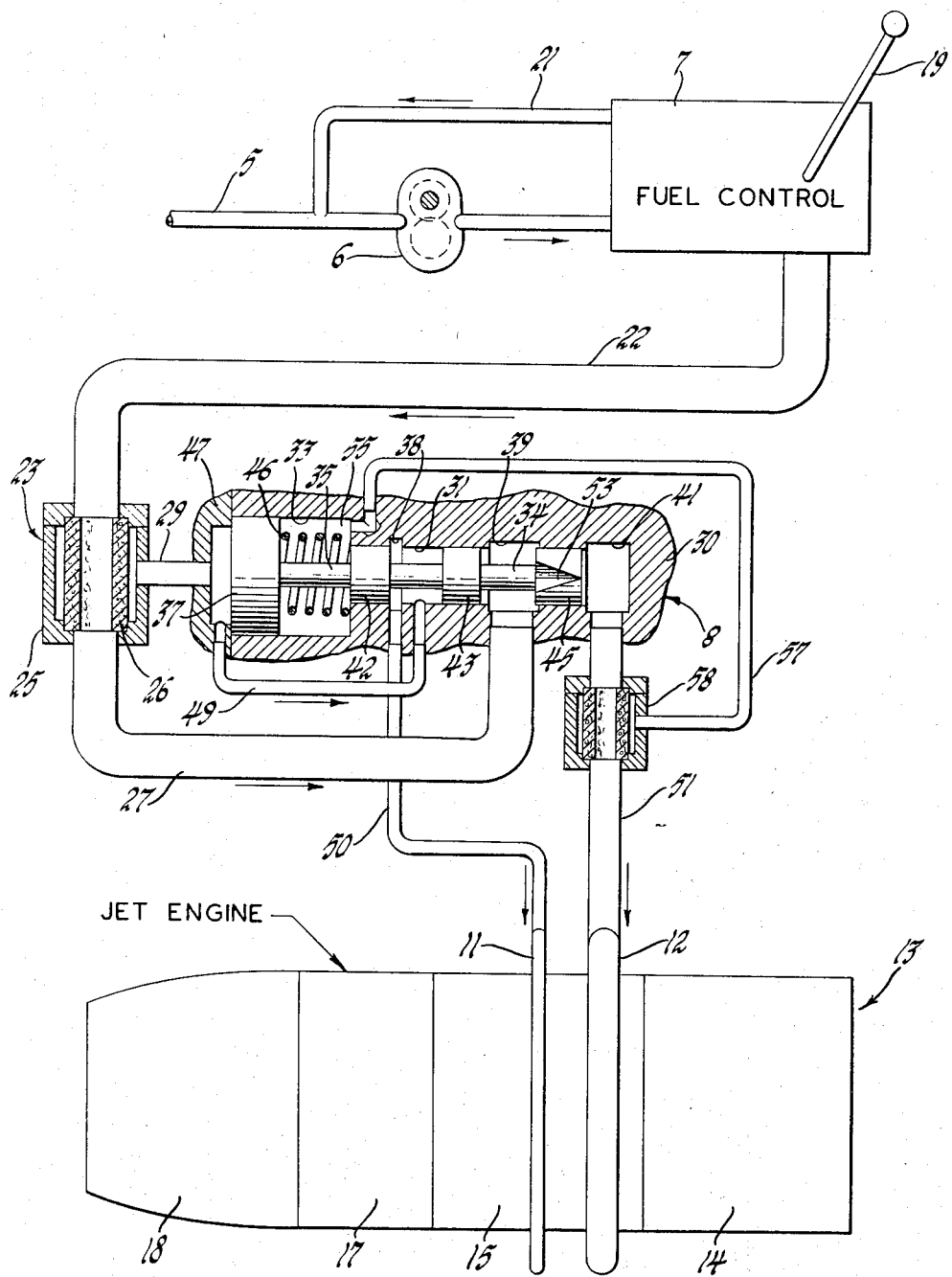

3,360,199
FUEL NOZZLE FUEL PROPORTIONING SYSTEM UTILIZING A FUEL PRESSURE RESPONSIVE VALVE
Cecil H. Sharpe, Brownsburg, Ind., assignor to General Motors Corporation, Detroit, Mich., a corporation of Delaware
Filed May 4, 1965, Ser. No. 453,059
2 Claims. (Cl. 239—66)

My invention relates to fuel systems of gas turbine engines and the like. It is particularly directed to means for apportioning or distributing fuel between the small flow and large flow ports of a duplex fuel nozzle or a set of such nozzles.

By way of background, gas turbine engines burning liquid fuel must be provided with some means to spray or diffuse the fuel for combustion. Most commonly a number of fuel spray nozzles are provided. In most installations, and particularly in those for aircraft, the rate of fuel flow varies over a wide range. For this reason, it is common to use dual or duplex fuel nozzles such, for example, as those shown in United States Patents No. 2,628,867 and No. 2,701,164. Such nozzles depend upon swirling the fuel for atomization. They have small swirl ports to achieve high swirl velocities at small flows and larger ports to provide the necessary capacity for high flows. The large ports must be shut off so as to direct the flow through the small ports until the rate of fuel supply becomes sufficiently large to require that the large ports begin to open. Thus, such nozzles are connected to the source of fuel through valves which may be provided individually in each nozzle as in Patent No. 2,701,164. On the other hand, all of the nozzles may be connected to primary and secondary manifolds with a single valve to divide flow between these manifolds.

My invention is directed to a valve which preferably is employed to divide flow between manifolds supplying large and small flow ports in a group of nozzles, but which may be connected in the supply line to a single nozzle. It embodies means for gradually opening the large flow or secondary nozzle outlet and concurrently gradually closing the small flow or primary outlet. It includes means for finely filtering the fuel directed to the primary outlet and for washing the filter and disposing of the sediment through the secondary outlet, which can tolerate it because of the larger ports. The finely filtered fuel also is employed to actuate the control valve of the invention, generally in accordance with the teachings of United States Patent No. 2,734,523.

The nature of the invention will be clear to those skilled in the art from the accompanying drawing of the preferred embodiment thereof and the succeeding detailed description.

Referring to the drawing, fuel supplied from any suitable source such as an aircraft boost pump to a line 5 is fed by a pump 6 through a fuel control 7 and a distributing valve 8 to a primary fuel manifold 11 and a secondary fuel manifold 12 of a gas turbine engine such as the turbojet engine 13. The engine, shown schematically, may include a compressor 14, a combustion apparatus 15, a turbine 17, and an exhaust duct or jet nozzle 18. The manifolds 11 and 12 are connected to a suitable number of fuel spray nozzles (not illustrated) in the combustion apparatus which may be, for example, of the type shown in United States Patent No. 2,701,164. The fuel control 7 determines the amount of fuel supplied to the engine and may be of any usual type. A manual power control lever 19 is indicated. The distributing valve 8 distributes the fuel flow between the manifolds 11 and 12 and includes, or is associated with, means to filter the fuel supplied to the primary manifold 11 and to wash the filter into the secondary manifold 12.

Describing the apparatus more in detail, the fuel control returns any excess fuel pumped through a bypass line 21 to the inlet of pump 6 and discharges the required fuel to the engine through a conduit 22 which is the inlet conduit of the distributing valve 8. Conduit 22 connects to the inlet of a wash-type filter 23 which comprises a casing 25 and a cylindrical filter element 26. The filter 23 discharges unfiltered fuel through a conduit 27, this fuel carrying with it any dirt caught by the filter element 26. The filter has an outlet conduit 29 for filtered fuel which may be termed a branch conduit. Conduits 27 and 29 run to the distributing valve 8 which comprises a body or housing 30 which defines a valve bore 31 and the cylinder 33 of an expansible chamber motor. A valve spool 34 is slidably mounted in the bore 31. It is connected by a stem 35 to a piston 37 in cylinder 33. The valve bore 31 is formed with three recesses or enlarged portions 38, 39, and 41 and the valve spool has three lands 42, 43, and 45. A compression spring 46 biases the valve and piston to the left as illustrated, movement being limited by engagement of the piston with the head 47 on the valve body. The branch conduit 29 enters cylinder 33 so as to bias piston 37 to the right. Conduit 29 is also connected through a further conduit 49 with valve bore 31 between the lands 42 and 43. The inlet conduit 27 downstream of filter 23 enters the valve body at recess 39 between lands 43 and 45.

A primary fuel conduit 50 extends from the recess 38 to the primary fuel manifold 11. A secondary fuel conduit 51 extends from the recess 41 to the secondary fuel manifold 12. Valve land 45 is provided with two or more converging notches 53 so that, as the land 45 moves into the recess 41, valve ports defined by these notches are progressively opened. In the position of rest of the valve illustrated, flow from line 27 to line 51 is cut off by land 45. Land 42 of the valve may move to cooperate with the edge of recess 38 to control flow from the branch conduit 29, 49 to the primary outlet 50. The chamber 55 within cylinder 33 to the right of the piston is suitably vented, preferably through a conduit 57 to a clean wash filter 58 through which the secondary fuel conduit 51 passes. By so connecting the vent, the chamber 55 is protected against any dirt in the fuel and any displacement from chamber 55 is supplied to the engine, thus compensating for fuel flow entering the left hand end of cylinder 33. The right side of piston 37 is thus referenced to combustion chamber pressure through conduit 51 and the fuel nozzles in the illustrated position of the valve.

The operation of the system is as follows: Assuming the engine is being started and fuel is supplied at a relatively low rate, the valve spool 45 shuts off flow to the secondary manifold but fuel flows to the primary manifold 11 through filter 26, line 29, line 49, past land 42 and through line 50. The back pressure of fuel due to flow through the nozzle ports and the combustion chamber pressure is reflected through lines 50 and 49 to the left side of piston 37. Combustion chamber pressure as such is reflected through lines 51 and 57 to act upon the right side of piston 37 and upon lands 42 and 45. Thus, valve 8 is biased by the pressure drop through the primary ports of the fuel nozzles.

As the fuel flow is increased with increasing speed of the engine, the increasing back pressure moves piston 37 to the right when the preload of spring 46 has been overcome. The spring is calibrated so that the valve begins to move as the flow begins to approach the capacity of the primary nozzle ports. Initial movement of land 42 has no significant throttling effect on the primary manifold but is accompanied by movement of land 45 to the right which begins to open the V-notches 53 and pass a small quantity of fuel to the secondary manifold. Atomization of this fuel is aided by the flow through the primary manifold. As flow gradually increases and pressure gradually builds up, piston 37 continues to move to the right, increasing the amount of fuel passing to the secondary manifold but without throttling primary flow significantly. Ultimately, however, the secondary flow becomes great enough for satisfactory atomization without assistance from the swirl due to flow through the small ports and at about this level of pressure valve 8 closes the primary flow and opens the secondary ports still further. A small pressure drop across the restriction caused by V-notches 53 will be present, but this back pressure is not significant or harmful. The primary flow is shut off, and the entire flow to the engine serves to wash the primary fuel filter 23 and the auxiliary filter 58.

If the engine is flying at such high altitudes or is so throttled back that flow becomes insufficient for the large flow ports, the previously described process will be reversed. Decreasing pressure will allow valve operating piston 37 to move to the left, first throttling flow to the secondary manifold and then opening the passage to the primary manifold. As before, the flow to the primary manifold must come through the fine filter 26.

The detailed description of the preferred embodiment of the invention for the purpose of explaining the principles thereof is not to be considered as limiting the invention, since various modifications may be made by the exercise of skill in the art.

I claim:

1. A fuel system including means for supplying fuel under pressure at a variably controlled flow rate, a primary fuel outlet for connection to fuel nozzle means adapted to handle relatively small fuel flows, and a secondary fuel outlet for connection to fuel nozzle means adapted to handle relatively large fuel flows, characterized by means for distributing fuel between the outlets comprising, in combination,
an inlet conduit connected to the supplying means,
a pressure responsive motor being energized by fuel pressure in the inlet conduit against a counteracting fuel pressure in said secondary outlet,
a primary fuel valve operated by the motor so as to move progressively to a closed position as pressure in the inlet conduit increases progressively above a predetermined value,
a primary fuel conduit supplied from the inlet conduit through the primary fuel valve and connected to the primary outlet,
a secondary fuel valve operated by the motor so as to open progressively from a closed position as pressure in the inlet conduit increases progressively above a predetermined value lower than the first-mentioned value,
and a secondary fuel conduit supplied from the inlet conduit through the secondary fuel valve and connected to the secondary fuel outlet.

2. A fuel system including means for supplying fuel under pressure at a variably controlled flow rate, a primary fuel outlet for connection to fuel nozzle means adapted to handle relatively small fuel flows, and a secondary fuel outlet for connection to fuel nozzle means adapted to handle relatively large fuel flows, characterized by means for distributing fuel between the outlets comprising, in combination,
an inlet conduit connected to the supplying means,
a branch conduit,
a filter washed by flow through the inlet conduit connected to supply filtered fuel from the inlet conduit to the primary outlet through the branch conduit,
a pressure responsive motor energized from the branch conduit,
a primary fuel valve operated by the motor so as to move progressively to a closed position as pressure in the branch conduit increases progressively above a predetermined value,
a primary fuel conduit supplied from the branch conduit through the primary fuel valve and connected to the primary outlet,
a secondary fuel valve operated by the motor so as to open progressively from a closed position as pressure in the branch conduit increases progressively above a predetermined value lower than the first-mentioned value,
and a secondary fuel conduit supplied from the inlet conduit downstream from the filter with an unfiltered washing flow of fuel through the secondary fuel valve and connected to the secondary fuel outlet.

References Cited

UNITED STATES PATENTS

| | | | |
|---|---|---|---|
| 550,583 | 12/1895 | Brinckman et al. | 210—433 X |
| 3,193,102 | 7/1965 | Bottoms et al. | 210—433 X |
| 3,293,858 | 12/1966 | Maljanian | 60—39.28 |
| 2,737,196 | 3/1956 | Eames | 137—118 X |
| 2,759,549 | 8/1956 | Best | 60—39.28 |
| 2,910,125 | 10/1959 | Best | 60—39.28 X |
| 2,927,425 | 3/1960 | Werts | 60—39.28 |
| 2,963,082 | 12/1960 | Binford et al. | 137—118 X |
| 2,979,894 | 4/1961 | Zeisloft | 137—118 X |

FOREIGN PATENTS 1,089,219  9/1960  Germany.

M. HENSON WOOD, JR., *Primary Examiner.*

V. C. WILKS, *Assistant Examiner.*